US009811882B2

(12) United States Patent
Lee et al.

(10) Patent No.: US 9,811,882 B2
(45) Date of Patent: Nov. 7, 2017

(54) METHOD AND APPARATUS FOR PROCESSING SUPER RESOLUTION IMAGE USING ADAPTIVE PREPROCESSING FILTERING AND/OR POSTPROCESSING FILTERING

(71) Applicant: Electronics and Telecommunications Research Institute, Daejeon (KR)

(72) Inventors: Dae Yeol Lee, Daejeon (KR); Se Yoon Jeong, Daejeon (KR); Suk Hee Cho, Daejeon (KR); Jong Ho Kim, Daejeon (KR); Hui Yong Kim, Daejeon (KR); Sung Chang Lim, Daejeon (KR); Jin Soo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/860,972

(22) Filed: Sep. 22, 2015

(65) Prior Publication Data
US 2016/0093022 A1    Mar. 31, 2016

(30) Foreign Application Priority Data

Sep. 30, 2014    (KR) .................. 10-2014-0131779
Mar. 9, 2015    (KR) .................. 10-2015-0032697

(51) Int. Cl.
*G06T 3/40* (2006.01)
*H04N 7/01* (2006.01)

(52) U.S. Cl.
CPC ......... *G06T 3/4053* (2013.01); *H04N 7/0117* (2013.01)

(58) Field of Classification Search
CPC ........ G06T 5/002; G06T 5/003; G06T 3/4053
See application file for complete search history.

(56) References Cited

U.S. PATENT DOCUMENTS

| 7,570,833 B2 * | 8/2009 | Lee .......................... G06T 5/20 348/216.1 |
| 8,184,164 B2 * | 5/2012 | Yang .................... G06T 1/0028 348/180 |

(Continued)

FOREIGN PATENT DOCUMENTS

| JP | 1808965 A1 * | 7/2007 | ......... G10L 21/0208 |
| JP | 2007-193508 A | 8/2007 | |

(Continued)

OTHER PUBLICATIONS

Lee et al., "Adaptive Pre/Post Filtering on Self-Similarity Based Super Resolution Video", 2015 Joint Conference of IWAIT and IFMIA, Jan. 11-13, 2015, National Cheng Kung University, Tainan, Taiwan.

*Primary Examiner* — Jingge Wu
(74) *Attorney, Agent, or Firm* — NSIP Law

(57) ABSTRACT

A method of processing a super resolution image using adaptive preprocessing filtering and/or postprocessing filtering is provided. A provided image processing apparatus may determine a preprocessing filter and a postprocessing filter based on frames included in a reference interval among a plurality of intervals in an input video, may perform filtering on the frames in the reference interval based on the preprocessing filter, may reconstruct a high frequency signal of each of the frames on which the filtering is performed, and may perform filtering on the frames, each having the reconstructed high frequency signal, based on the postprocessing filter.

11 Claims, 12 Drawing Sheets

(56) References Cited

U.S. PATENT DOCUMENTS

| | | | |
|---|---|---|---|
| 9,176,987 B1* | 11/2015 | Peng | G06F 17/30253 |
| 2005/0094003 A1* | 5/2005 | Thorell | H04N 19/86 |
| | | | 348/241 |
| 2007/0229710 A1* | 10/2007 | Park | H04N 19/86 |
| | | | 348/618 |
| 2008/0267524 A1* | 10/2008 | Shaked | G06T 5/002 |
| | | | 382/263 |
| 2009/0252432 A1* | 10/2009 | Shi | G06T 5/009 |
| | | | 382/274 |
| 2010/0098349 A1* | 4/2010 | Arashima | G09G 3/3648 |
| | | | 382/263 |
| 2010/0165122 A1* | 7/2010 | Castorina | H04N 5/23248 |
| | | | 348/208.4 |
| 2011/0150095 A1 | 6/2011 | Choi et al. | |
| 2012/0328213 A1* | 12/2012 | Yamamoto | G06T 3/4053 |
| | | | 382/300 |
| 2013/0058585 A1 | 3/2013 | Lim et al. | |
| 2014/0028878 A1* | 1/2014 | S. V. | H04N 5/23232 |
| | | | 348/239 |
| 2014/0092998 A1* | 4/2014 | Zhu | H04N 19/70 |
| | | | 375/240.29 |
| 2014/0112394 A1* | 4/2014 | Sullivan | H04N 19/46 |
| | | | 375/240.26 |
| 2014/0219366 A1* | 8/2014 | Faroudja | H04N 19/80 |
| | | | 375/240.29 |
| 2014/0286539 A1* | 9/2014 | Shetty | G01V 5/12 |
| | | | 382/109 |
| 2015/0208084 A1* | 7/2015 | Zhu | H04N 19/105 |
| | | | 375/240.02 |

FOREIGN PATENT DOCUMENTS

| | | |
|---|---|---|
| KR | 10-2005-0106548 A | 11/2005 |
| KR | 10-2011-0089666 A | 8/2011 |
| KR | 10-2012-0099479 A | 9/2012 |
| KR | 10-2014-0034149 A | 3/2014 |
| KR | 10-2014-0081481 A | 7/2014 |

* cited by examiner

FIG. 6

| Ind ($G_i > T_G$) | | | |
|---|---|---|---|
| Noise information | 0.9 | 0.3 | 0.5 |
| Sharpness information | 0.2 | 0.9 | 0.3 |
| Whether to apply denoising filter | O (Preprocessing) | X | X |
| Whether to apply sharpening filter | X | X | O (Postprocessing) |

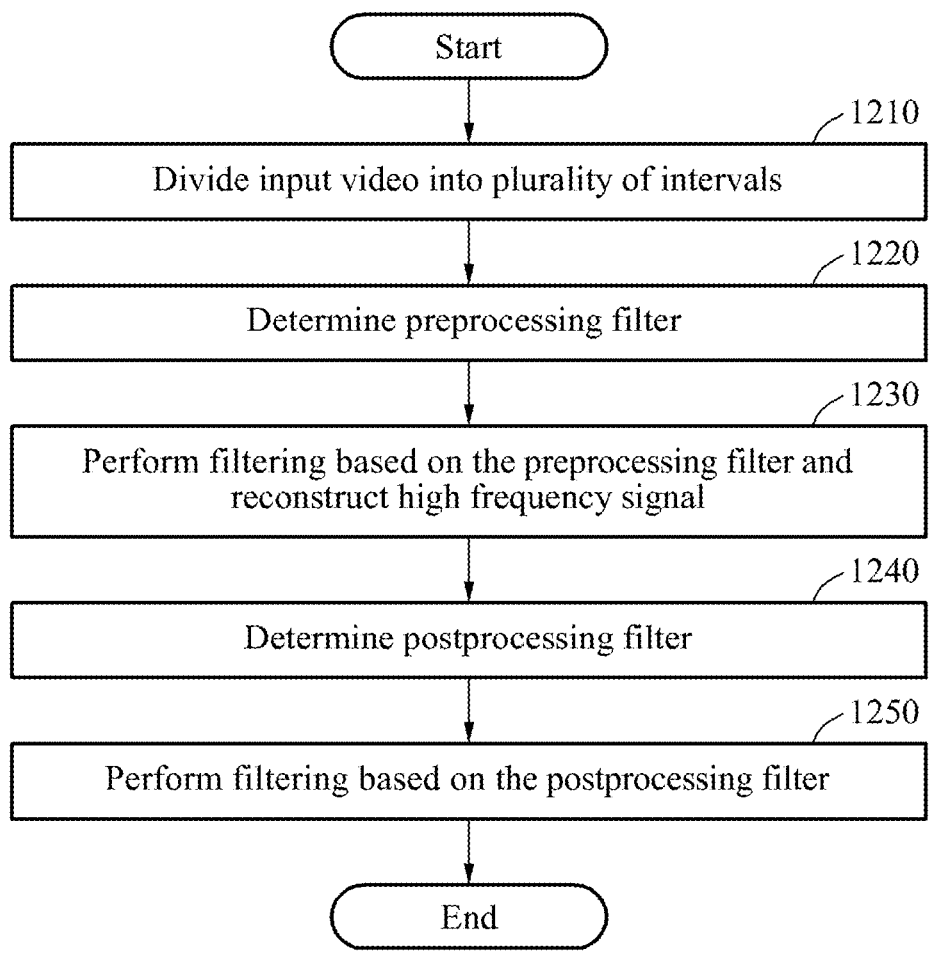

METHOD AND APPARATUS FOR PROCESSING SUPER RESOLUTION IMAGE USING ADAPTIVE PREPROCESSING FILTERING AND/OR POSTPROCESSING FILTERING

CROSS-REFERENCE TO RELATED APPLICATIONS

This application claims the benefit of Korean Patent Application No. 10-2014-0131779 and of Korean Patent Application No. 10-2015-0032697, respectively filed on Sep. 30, 2014 and Mar. 9, 2015, in the Korean Intellectual Property Office, the disclosures of which are incorporated herein by reference.

BACKGROUND

1. Field of the Invention

The following description relates to a method of processing a super resolution image using adaptive preprocessing filtering and/or postprocessing filtering, and more particularly, and more particularly, to an image processing method and apparatus for determining a preprocessing filter and a postprocessing filter optimized for each of a plurality of intervals in an input video, and for converting the input video into a super resolution video.

2. Description of the Related Art

Due to image content with a high-definition (HD) resolution that have been provided to various mobile terminals and televisions (TVs), a technology of converting captured images to high resolution images is receiving attention. Also, recently, due to an increase in an interest in an ultra HD (UHD) with a resolution four times than that of an HD, a high-quality upscale solution for converting existing content to UHD content has been emerged as a key technology in terminals and TVs.

However, when a low resolution video or a video captured at a low quality is converted into a super resolution video, a quality of the super resolution video may decrease due to a contrast, a sharpness and noise of a video. Similarly, when a low resolution image or an image captured at a low quality is converted into a super resolution image, a quality of the super resolution image may decrease due to a contrast, a sharpness and noise of an image.

SUMMARY

An aspect of the present invention provides a method of effectively converting an input video into a super resolution video by determining a preprocessing filter and a postprocessing filter optimized for each of a plurality of intervals in the input video and performing filtering on the plurality of intervals during conversion of the input video into the super resolution video.

Another aspect of the present invention provides a method of performing contrast filtering before an input video is converted into a super resolution video, to prevent an inappropriate high frequency signal from being reconstructed due to a weak contrast during conversion of the input video into the super resolution video.

Still another aspect of the present invention provides a method of performing denoising filtering before an input video is converted into a super resolution video, to prevent an inappropriate high frequency signal from being reconstructed due to noise during conversion of the input video into the super resolution video.

Yet another aspect of the present invention provides a method of performing sharpening filtering after an input video is converted into a super resolution video, to enhance a sharpness of a portion of high frequency signals that are insufficiently reconstructed during conversion of the input video into the super resolution video, and to effectively prevent an inappropriate high frequency signal from being reconstructed when the sharpening filtering is performed as preprocessing filtering before the input video is converted into the super resolution video.

According to an aspect of the present invention, there is provided an image processing method including dividing an input video into a plurality of intervals, determining a preprocessing filter and a postprocessing filter based on frames included in a reference interval among the plurality of intervals, performing filtering on the frames in the reference interval based on the preprocessing filter, reconstructing a high frequency signal of each of the frames on which the filtering is performed, and performing filtering on the frames, each having the reconstructed high frequency signal, based on the postprocessing filter.

The dividing of the input video into the plurality of intervals may include detecting a boundary frame in which a scene changes in the input video, and dividing the input video into the plurality of intervals based on the boundary frame.

The determining of the preprocessing filter and the postprocessing filter may include calculating contrast information of the frames in the reference interval, and determining, based on the contrast information, whether a contrast filter is to be applied as the preprocessing filter.

The determining of the preprocessing filter and the postprocessing filter may further include determining a parameter to be applied to the contrast filter based on the contrast information when the contrast filter is determined to be applied as the preprocessing filter.

The determining of the parameter to be applied to the contrast filter may include determining the parameter to adjust a strength of the contrast filter based on a difference between the contrast information and a contrast threshold.

The determining of the preprocessing filter and the postprocessing filter may include calculating noise information of the frames in the reference interval, and determining, based on the noise information, whether a denoising filter is to be applied as the preprocessing filter.

The determining of the preprocessing filter and the postprocessing filter may further include determining a parameter to be applied to the denoising filter based on the noise information when the denoising filter is determined to be applied as the preprocessing filter.

The determining of the parameter to be applied to the denoising filter may include determining the parameter to adjust a strength of the denoising filter based on a difference between the noise information and a noise threshold.

The determining of the preprocessing filter and the postprocessing filter may include calculating sharpness information of the frames in the reference interval, and determining, based on the sharpness information, whether a sharpening filter is to be applied as the postprocessing filter.

The determining of whether the sharpening filter is to be applied as the postprocessing filter may include determining the sharpening filter not to be applied as the postprocessing filter when the sharpness information is equal to or less than a sharpness threshold and when noise information of the frames in the reference interval is equal to or greater than a noise threshold.

The determining of the preprocessing filter and the postprocessing filter may further include determining a parameter to be applied to the sharpening filter based on the sharpness information when the sharpening filter is determined to be applied as the postprocessing filter.

The determining of the parameter to be applied to the sharpening filter may include determining the parameter to adjust a strength of the sharpening filter based on a difference between the sharpness information and a sharpness threshold.

The reconstructing of the high frequency signal may include dividing each of the frames into a plurality of patches and reconstructing the high frequency signal based on a plurality of high frequency patches that respectively correspond to the plurality of patches and that respectively include high frequency signals.

The image processing method may further include outputting the frames on which the filtering is performed based on the postprocessing filter, for each of the intervals.

A similarity in a characteristic between the frames in the reference interval may be equal to or less than a predetermined threshold. The characteristic may include at least one of a background, an illumination environment and a zoom-in.

According to another aspect of the present invention, there is provided an image processing apparatus including an interval divider to divide an input video into a plurality of intervals, a filter determiner to determine a preprocessing filter and a postprocessing filter based on frames included in a reference interval among the plurality of intervals, and an image filtering unit to perform filtering on the frames in the reference interval based on the preprocessing filter, to reconstruct a high frequency signal of each of the frames on which the filtering is performed, and to perform filtering on the frames, each having the reconstructed high frequency signal, based on the postprocessing filter.

According to another aspect of the present invention, there is provided an image processing method including dividing an input video into a plurality of intervals, determining a preprocessing filter based on frames included in a reference interval among the plurality of intervals, performing filtering on the frames in the reference interval based on the preprocessing filter and reconstructing a high frequency signal of each of the frames on which the filtering is performed, determining a postprocessing filter based on the frames, each having the reconstructed high frequency signal, and performing filtering on the frames, each having the reconstructed high frequency signal, based on the postprocessing filter.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 6 is a diagram provided to explain an operation of a sharpening filter/denoising filter determiner according to an embodiment;

FIG. 12 is a flowchart illustrating another example of an image processing method according to an embodiment.

DETAILED DESCRIPTION

Figure 1:
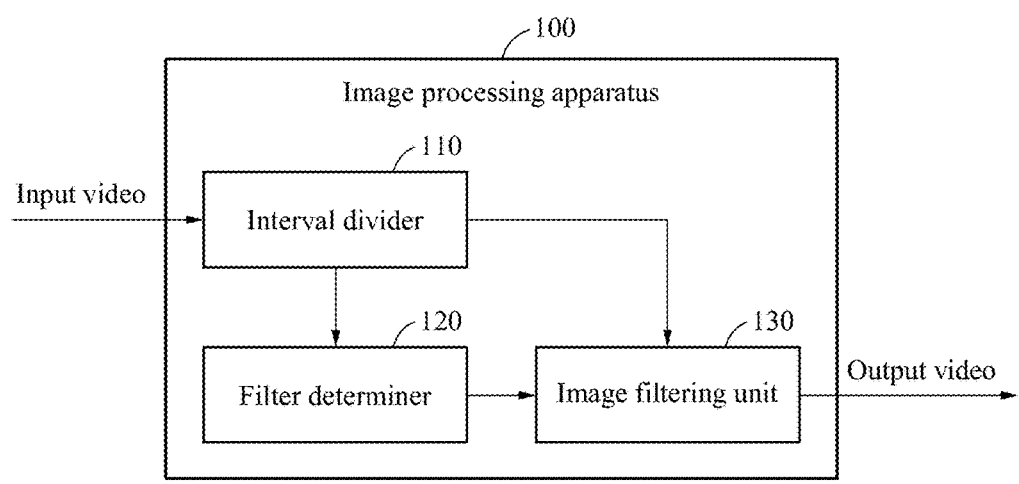
FIG. 1 is a block diagram illustrating an example of an image processing apparatus according to an embodiment.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating an image processing apparatus 100 according to an embodiment.

The image processing apparatus 100 may be, for example, an apparatus for enhancing a resolution of an input video and outputting the input video, and may use a super resolution technology. The super resolution technology may refer to a scheme of reconstructing a video with a relatively high sharpness and a relatively high resolution (for example, a high-resolution video) from an video with a relatively low resolution (for example, a low-resolution video) or a scheme of reconstructing an image with a relatively high sharpness and a relatively high resolution (for example, a high-resolution image) from an image with a relatively low resolution (for example, a low-resolution image). To reconstruct a high-resolution video or a high-resolution image, the super resolution technology may estimate a high frequency component that is lack in the low-resolution video or the low-resolution image.

The image processing apparatus 100 of FIG. 1 may be, for example, an apparatus for processing an input video, and may include an interval divider 110, a filter determiner 120 and an image filtering unit 130. For example, the image processing apparatus 100 may be implemented by a software module, a hardware module or a combination thereof. The image processing apparatus 100 may be mounted in various computing apparatuses and/or systems, for example, a smartphone, a tablet personal computer (PC), a laptop computer, a desktop computer, a television (TV), a wearable device, a security system, or a smart home system.

The interval divider 110 may divide an input video into a plurality of intervals. The input video may include a plurality of frames, and may be received from a sensor or a storage device. The sensor may be an apparatus for generating a video, and may include, for example, a complementary metal-oxide semiconductor (CMOS) image sensor (CIS), a dynamic vision sensor (DVS), or a depth sensor.

The interval divider 110 may divide the input video into the plurality of intervals based on whether a scene changes in the input video. For example, the interval divider 110 may detect a boundary frame in which a scene changes among a plurality of frames included in the input video, and may divide the input video into a plurality of intervals based on the boundary frame.

The interval divider 110 may detect the boundary frame, for example, based on color histogram residual information or a change in an intensity between the plurality of frames in the input video, however, there is no limitation thereto. For example, various scene change detection technologies may be applicable.

When a scene changes in the input video, characteristics of the frames included in the input video may change. The characteristics may include, for example, a background, an illumination environment or a zoom-in of the frames. When the characteristics change, a type of a preprocessing filter or a postprocessing filter optimized for enhancement of a quality of a super resolution video may change. Accordingly, the interval divider 110 may divide the input video into intervals, and the filter determiner 120 may analyze characteristics of frames for each of the intervals and may determine a preprocessing filter and a postprocessing filter.

The interval divider 110 may transmit the divided input video to the filter determiner 120 and the image filtering unit 130. In an example, the interval divider 110 may transmit division information associated with the input video together with the input video to the filter determiner 120 and the image filtering unit 130. In another example, the interval divider 110 may transmit frames included in a reference interval among the plurality of intervals to the filter determiner 120 and the image filtering unit 130. In this example, the interval divider 110 may sequentially the plurality of intervals to the filter determiner 120 and the image filtering unit 130.

The filter determiner 120 may determine a preprocessing filter and a postprocessing filter based on frames included in a reference interval among the plurality of intervals into which the input video is divided. The filter determiner 120 may determine preprocessing filters and postprocessing filters to be applied to each of the plurality of intervals. However, for convenience of description, an operation of each of the filter determiner 120 and the image filtering unit 130 will be described below based on the reference interval.

The preprocessing filter may refer to an image filter applied to frames prior to reconstructing of a high frequency signal of each of the frames in the image filtering unit 130. The postprocessing filter may refer to an image filter applied to frames after the reconstructing of the high frequency signal of each of the frames.

The filter determiner 120 may transmit filter information associated with the determined preprocessing filter and the determined postprocessing filter to the image filtering unit 130. The operation of the filter determiner 120 will be further described with reference to FIGS. 2 through 6 below.

The image filtering unit 130 may perform filtering on the frames in the reference interval based on the filter information received from the filter determiner 120. The filter information may include, for example, a reference interval to which the preprocessing filter and the postprocessing filter are to be applied, a type of each of the preprocessing filter and the postprocessing filter, or a parameter of each of the preprocessing filter and the postprocessing filter.

The image filtering unit 130 may perform filtering on the frames in the reference interval based on the preprocessing filter determined by the filter determiner 120, may reconstruct a high frequency signal of each of the frames on which the filtering is performed, and may perform filtering on the frames, each having the reconstructed high frequency signal, based on the postprocessing filter determined by the filter determiner 120. The reconstructing of the high frequency signal in the image filtering unit 130 may indicate converting the frames in the reference interval into super resolution frames.

The image filtering unit 130 may sequentially receive the plurality of intervals. The image filtering unit 130 may output, for each of the intervals, the frames on which the filtering is performed based on the postprocessing filter. The image filtering unit 130 may output the plurality of intervals in a sequence of completion of the filtering. For example, the image filtering unit 130 may output an output video by sequentially appending processed intervals to an output file. The image filtering unit 130 will be further described with reference to FIGS. 7 and 8 below.

Figure 2:
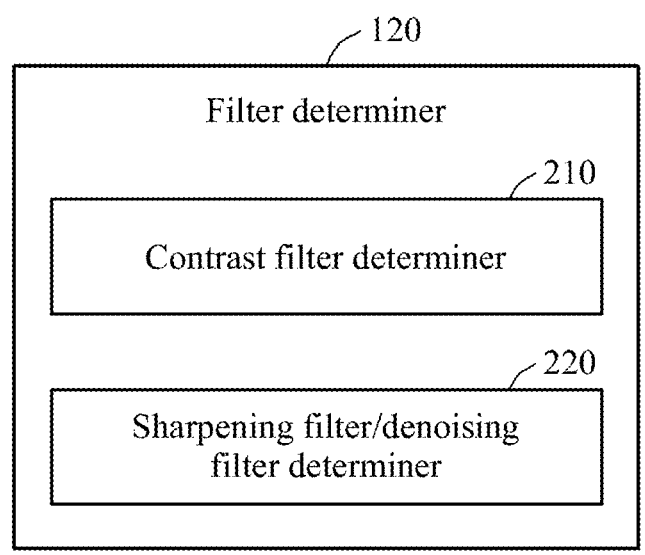
FIG. 2 is a block diagram illustrating a configuration of a filter determiner in the image processing apparatus of FIG. 1.

FIG. 2 is a block diagram illustrating a configuration of the filter determiner 120 of FIG. 1.

Referring to FIG. 2, the filter determiner 120 may include a contrast filter determiner 210 and a sharpening filter and/or denoising filter (sharpening filter/denoising filter determiner 220. The filter determiner 120 may analyze characteristics of frames included in a reference interval among the plurality of intervals received from the interval divider 110 of FIG. 1, and may determine an image filter to be applied to each of the frames.

The contrast filter determiner 210 may analyze the frames in the reference interval, and may calculate contrast information of the reference interval. The contrast information may be obtained by numerically expressing a contrast performance of the frames in the reference interval, and may have a value between "0" and "1." When the contrast performance increases, the contrast information may have a value close to "1".

For example, the contrast filter determiner 210 may measure contrast information using Equations 1 and 2 as shown below.

$$c_i = \frac{Hist_{bright,i} - Hist_{dark,i}}{Hist_{avg,i}} \times \alpha \quad \text{[Equation 1]}$$

$$c_{avg} = \frac{1}{N} \sum_{i=1}^{N} c_i \quad \text{[Equation 2]}$$

In Equations 1 and 2, cavg denotes an average value of contrast information of the frames in the reference interval, as the contrast information of the reference interval. In addition, $c_i$ denotes contrast information of an i-th frame in the reference interval, and N denotes a number of the frames in the reference interval. Furthermore, $\alpha$ denotes a normalization constant to limit a range of the contrast information to a value between "0" and "1."

Also, $Hist_{bright,i}$, $Hist_{dark,i}$ and $Hist_{avg,i}$ denote information acquired based on an intensity histogram of the i-th frame. $Hist_{bright,i}$ may be a center of mass of a bright portion of the intensity histogram of the i-th frame. For example, the contrast filter determiner 210 may calculate $Hist_{bright,i}$ using Equation 3 shown below.

$$Hist_{bright,i} = \frac{\sum_{p=T_i}^{I_{max,i}} p \times h(p)}{\sum_{p=T_i}^{I_{max,i}} h(p)}$$ [Equation 3]

In Equation 3, $I_{max,i}$ denotes a maximum brightness value of a pixel among pixels included in the i-th frame, p denotes a pixel brightness value, and h(p) denotes a number of pixels with the same brightness value as the pixel brightness value p among the pixels in the i-th frame. In addition, $T_i$ denotes an intensity threshold used to distinguish between a dark portion and the bright portion of the intensity histogram of the i-th frame.

$Hist_{dark,i}$ may be a center of mass of the dark portion of the intensity histogram of the i-th frame. For example, the contrast filter determiner 210 may calculate $Hist_{dark,i}$ using Equation 4 shown below.

$$Hist_{dark,i} = \frac{\sum_{p=I_{min,i}}^{T_i} p \times h(p)}{\sum_{i=I_{min,i}}^{T_i} h(p)} \times \alpha$$ [Equation 4]

In Equation 4, $I_{min,i}$ denotes a minimum brightness value of a pixel among the pixels in the i-th frame.

$Hist_{avg,i}$ may be a center of mass of all portions of the intensity histogram of the i-th frame. For example, the contrast filter determiner 210 may measure $Hist_{avg,i}$ using Equation 5 shown below.

$$Hist_{avg,i} = \frac{\sum_{p=I_{min,i}}^{I_{max,i}} p \times h(p)}{\sum_{p=I_{min,i}}^{I_{max,i}} h(p)}$$ [Equation 5]

The contrast filter determiner 210 may calculate the intensity threshold $T_i$ using Equation 6 shown below.

$\mathrm{argmin}_{T_i \in [I_{min,i}, I_{max,i}]} |(\Sigma_{p=I_{min,i}}^{T_i} p \times h(p)) - (\Sigma_{p=T_i}^{I_{max,i}} p \times h(p))|$ [Equation 6]

The contrast filter determiner 210 may divide the intensity histogram of the i-th frame into the dark portion and the bright portion based on the intensity threshold $T_i$. The contrast filter determiner 210 may determine the contrast information $C_i$ based on the centers of mass $Hist_{dark,i}$, $Hist_{bright,i}$ and $Hist_{avg,i}$. Also, the contrast filter determiner 210 may determine the contrast information $C_{avg}$ based on contrast information of the frames in the reference interval.

The contrast filter determiner 210 may determine filter information associated with the contrast filter to be applied to the reference interval, based on the determined contrast information $C_i$ and $C_{avg}$. The filter information may include information regarding whether the contrast filter is to be applied as a preprocessing filter to the reference interval, and a parameter that is to be applied to the contrast filter. For example, the parameter to be applied to the contrast filter may refer to a degree to which a contrast of each of the frames in the reference interval is strengthened. The information regarding whether the contrast filter is to be applied as a preprocessing filter to the reference interval may be included in the form of a flag in the filter information.

When the contrast information of the reference interval is equal to or less than a contrast threshold, the contrast filter determiner 210 may determine to apply the contrast filter as a preprocessing filter of the reference interval. Furthermore, the contrast filter determiner 210 may determine a parameter to adjust a strength of the contrast filter based on a difference between the contrast threshold and the contrast information. For example, the parameter may be determined so that the strength of the contrast filter may increase as a value of the contrast information is less than the contrast threshold.

The contrast filter determiner 210 may transmit the determined filter information to the image filtering unit 130 of FIG. 1.

The sharpening filter/denoising filter determiner 220 may analyze the frames in the reference interval, and may calculate sharpness information of the reference interval.

The sharpness information may be obtained by numerically expressing an average magnitude of a dominant edge region and a dominant texture region in the frames in the reference interval, and may have a value between "0" and "1." When an intensity of a high frequency signal of an edge or a texture of the frames in the reference interval increases, the sharpness information may have a value close to "1".

The sharpening filter/denoising filter determiner 220 may determine filter information associated with the sharpening filter to be applied to the reference interval, based on the sharpness information. The filter information may include information regarding whether the sharpening filter is to be applied as a postprocessing filter to the reference interval, and a parameter that is to be applied to the sharpening filter. For example, the parameter to be applied to the sharpening filter may refer to a degree to which a sharpness of each of the frames in the reference interval is strengthened. The information regarding whether the sharpening filter is to be applied as a postprocessing filter to the reference interval may be included in the form of a flag in the filter information.

The sharpening filter/denoising filter determiner 220 may analyze the frames in the reference interval, and may calculate noise information of the reference interval.

The noise information may be obtained by numerically expressing an average density of a dominant edge region and a dominant texture region in the frames in the reference interval, and may have a value between "0" and "1." When an amount of noise occurring in the frames in the reference interval increases, the noise information may have a value close to "1."

The sharpening filter/denoising filter determiner 220 may determine filter information associated with the denoising filter to be applied to the reference interval, based on the noise information. The filter information may include information regarding whether the denoising filter is to be applied as a preprocessing filter to the reference interval, and a parameter that is to be applied to the denoising filter. For example, the parameter to be applied to the denoising filter may refer to a degree to which noise of the frames in the reference interval is removed. The information regarding whether the denoising filter is to be applied as a preprocessing filter to the reference interval may be included in the form of a flag in the filter information.

The sharpening filter/denoising filter determiner 220 may transmit the determined filter information to the image filtering unit 130.

An operation of the sharpening filter/denoising filter determiner 220 will be further described with reference to FIG. 5.

Figure 3:
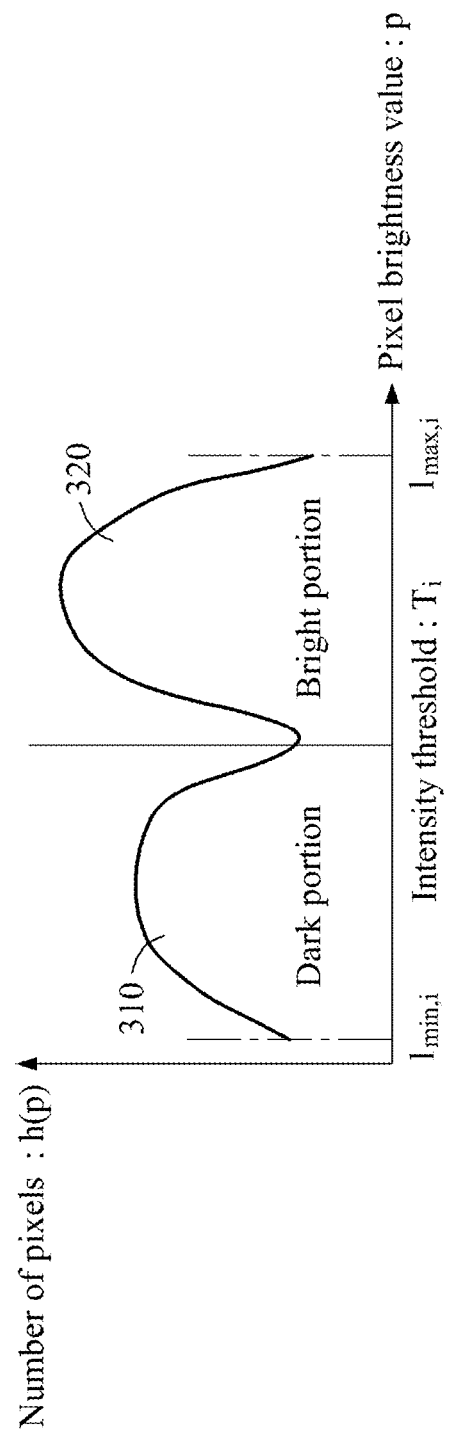
FIG. 3 is a diagram provided to explain a process by which a contrast filter determiner distinguishes between a dark portion and a bright portion in an intensity histogram according to an embodiment.

FIG. 3 is a diagram provided to explain a process by which a contrast filter determiner distinguishes between a dark portion and a bright portion in an intensity histogram according to an embodiment.

Referring to FIG. 3, an intensity histogram of an i-th frame in a reference interval may be formed based on a number h(p) of pixels with a pixel brightness value p between a maximum brightness value $I_{min,i}$ and a minimum brightness value $I_{max,i}$ of a pixel among pixels in the i-th frame.

The contrast filter determiner 210 of FIG. 2 may divide the intensity histogram into a dark portion 310 and a bright portion 320 based on an intensity threshold $T_i$. For example, the contrast filter determiner 210 may classify, as the dark portion 310, pixels that each have a pixel brightness value greater than the minimum brightness value $I_{min,i}$ and less than the intensity threshold $T_i$. Also, the contrast filter determiner 210 may classify, as the bright portion 320, pixels that each have a pixel brightness value greater than the intensity threshold $T_i$ and less than the maximum brightness value $I_{max,i}$.

Figure 4:
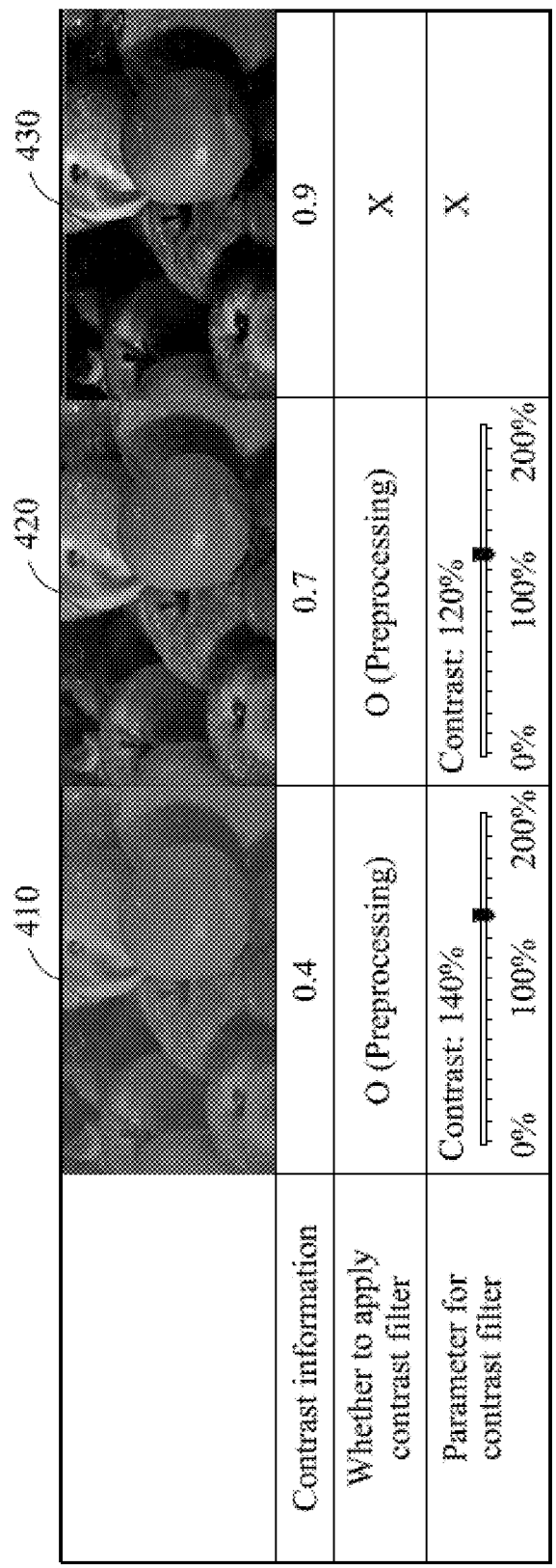
FIG. 4 is a diagram provided to explain an operation of a contrast filter determiner according to an embodiment.

FIG. 4 is a diagram provided to explain an operation of a contrast filter determiner according to an embodiment.

In FIG. 4, a first interval 410, a second interval 420 or a third interval 430 may be set as a reference interval. In addition, a contrast threshold may be set to "0.8," however, an example of a contrast threshold set by the contrast filter determiner is not limited thereto.

Contrast information of the first interval 410 may have a value of "0.4." Because the contrast information of the first interval 410 is less than the contrast threshold of "0.8," the contrast filter determiner may determine to apply a contrast filter as a preprocessing filter to the first interval 410, and may include a determination result in filter information associated with the contrast filter.

Contrast information of the second interval 420 may have a value of "0.7." Because the contrast information of the second interval 420 is less than the contrast threshold of "0.8," the contrast filter determiner may determine to apply a contrast filter as a preprocessing filter to the second interval 420, and may include a determination result in filter information associated with the contrast filter.

A difference between the contrast threshold and the contrast information of the first interval 410 may be greater than a difference between the contrast threshold and the contrast information of the second interval 420. Accordingly, the contrast filter determiner may set a parameter of the contrast filter so that a strength of the contrast filter to be applied to the first interval 410 may be set to be greater than a strength of the contrast filter to be applied to the second interval 420. During a preprocessing filtering process, a contrast of the first interval 410 may be considerably strengthened in comparison to the second interval 420.

Contrast information of the third interval 430 may have a value of "0.9." Because the contrast information of the third interval 430 exceeds the contrast threshold of "0.8," the contrast filter determiner may determine not to apply a contrast filter as a preprocessing filter to the third interval 430, and may include a determination result in filter information associated with the contrast filter.

When an input video with a weak contrast is converted into a super resolution video, an inappropriate high frequency signal may be likely to be reconstructed and included in the super resolution video. Accordingly, the contrast filter determiner may divide the input video into a plurality of intervals, and may apply a contrast filter as a preprocessing filter to an interval with a weak contrast and thus, it is possible to prevent an inappropriate high frequency signal from being reconstructed.

Figure 5:
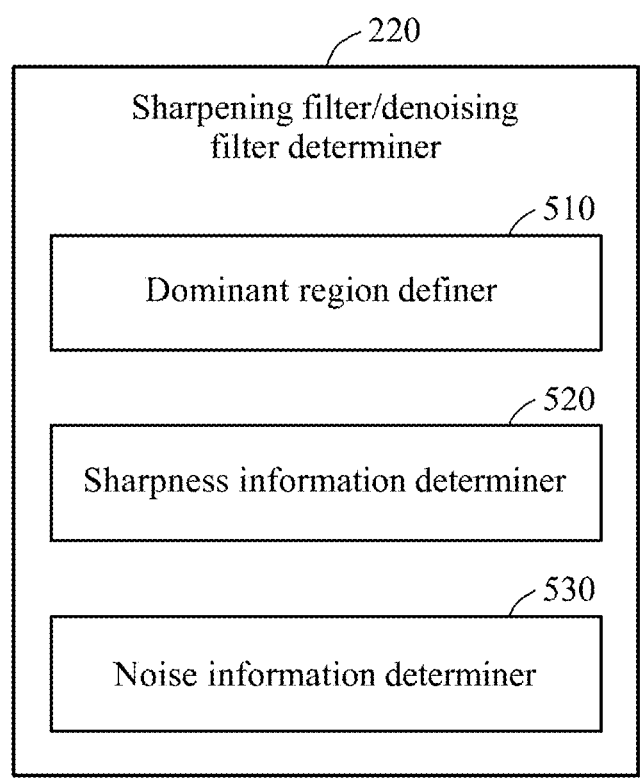
FIG. 5 is a block diagram illustrating a configuration of a sharpening filter/denoising filter determiner in the filter determiner of FIG. 2.

FIG. 5 is a block diagram illustrating a configuration of the sharpening filter/denoising filter determiner 220 of FIG. 2.

Referring to FIG. 5, the sharpening filter/denoising filter determiner 220 may include a dominant region definer 510, a sharpness information determiner 520, and a noise information determiner 530.

The dominant region definer 510 may define, as dominant regions, an edge region and a texture region that are dominant in comparison to the other portions in the frames in the reference interval.

The dominant region definer 510 may set a plane $G_i$ to define a dominant region. The plane $G_i$ may refer to a plane indicating an intensity of each of an edge region and a texture region included in the i-th frame in the reference interval, and may have the same resolution as the i-th frame.

When pixels correspond to a dominant edge region and a dominant texture region, a value of the plane $G_i$ may increase in the pixels. For example, the plane $G_i$ may be calculated using Equation 7 shown below.

$$G_i = \left(\frac{\delta F_i}{\delta x}\frac{\delta F_i}{\delta x} + \frac{\delta F_i}{\delta x}\frac{\delta F_i}{\delta y} + \frac{\delta F_i}{\delta y}\frac{\delta F_i}{\delta y}\right) \times \beta \quad \text{[Equation 7]}$$

In Equation 7, $$\frac{\delta F_i}{\delta x}$$

denotes a primary gradient value of an i-th frame $F_i$ in an x-axis direction, and $$\frac{\delta F_i}{\delta y}$$

denotes a primary gradient value of the i-th frame $F_i$ in a y-axis direction. In addition, β denotes a normalization constant.

Also, the dominant region definer 510 may define pixels that have a magnitude of an edge region and a texture region greater than an edge and/or texture (edge/texture) threshold among pixels included in the plane $G_1$, to be in a dominant region.

The sharpness information determiner 520 may analyze characteristics of the frames in the reference interval based on the dominant region, and may determine the sharpness information of the reference interval. The sharpness information may be obtained by numerically expressing an average magnitude of dominant regions defined in the frames in the reference interval, and may have a value between "0" and "1." When an intensity of a high frequency signal of an edge or a texture of the frames in the reference interval increases, the sharpness information may have a value close to "1."

For example, the sharpness information determiner 520 may calculate the sharpness information using Equations 8 and 9 shown below.

$$S_i = \frac{\sum G_i(G_i > T_G)}{\sum Ind(G_i > T_G)} \times \Gamma \quad \text{[Equation 8]}$$

$$S_{avg} = \frac{1}{N}\sum_{i=1}^{N} S_i \quad \text{[Equation 9]}$$

In Equations 8 and 9, $S_i$ denotes sharpness information of the i-th frame in the reference interval, and N denotes a number of frames included in an interval of a video. Also, $S_{avg}$ denotes sharpness information of the reference interval, and may be calculated as an average of the sharpness information $S_i$. In addition, $\Gamma$ denotes a normalization constant to limit a range of the sharpness information $S_i$ to a range of "0" to "1."

Also, $T_G$ denotes an edge/texture threshold, and $G_i$ denotes the plane with pixels defined to be in a dominant region of the i-th frame and "$G_i>T_G$" indicates that an intensity of each of the pixels is greater than the edge/texture threshold $T_G$. In addition, $Ind(G_i>T_G)$ denotes an impulse function to set a value of "1" to pixels in the dominant region satisfying "$G_i>T_G$." In other words, the impulse function $Ind(G_i>T_G)$ may be "1" for the pixels in the dominant region, and may be "0" for the other pixels. "$\Sigma Ind(G_i>T_G)$" as a sum of impulse functions $Ind(G_i>T_G)$ of all pixels included in the i-th frame may be a number of pixels defined to be in a dominant region of the i-th frame.

Accordingly, $$\frac{\sum G_i(G_i > T_G)}{\sum Ind(G_i > T_G)}$$

may be an average magnitude of the pixels defined to be in a dominant region of the i-th frame.

When sharpness information of a reference interval among the plurality of intervals is equal to or less than a sharpness threshold, the sharpness information determiner 520 may determine the reference interval as an interval of which sharpness needs to be strengthened. The sharpness information determiner 520 may determine the reference interval as a target to which the sharpening filter is applied. The sharpness information determiner 520 may transfer a parameter associated with the sharpening filter to a super resolution filter that converts the reference interval into a super resolution video. In this example, the super resolution filter may need to be modified to receive the parameter associated with the sharpening filter, and the image filtering unit 130 of FIG. 1 may reconstruct a high frequency signal of each of the frames using the super resolution filter based on the parameter associated with the sharpening filter.

The sharpness information determiner 520 may determine the parameter associated with the sharpening filter so that a strength of the sharpening filter applied to the reference interval may increase as a value of the sharpness information of the reference interval decreases.

When a sharpness of each of the frames in the reference interval is enhanced prior to reconstructing of a high frequency signal of each of the frames, an artifact may occur. Due to the artifact, an inappropriate high frequency signal may be reconstructed during the reconstruction of the high frequency signal, which may lead to a great reduction in a quality of the frames. Accordingly, the sharpening filter determined by the sharpening filter/denoising filter determiner 220 may be applied as a postprocessing filter to the reference interval. Alternatively, when the parameter associated with the sharpening filter is received, the super resolution filter may be applied to the reference interval after a similar patch search process.

For example, a large amount of noise may occur in a reference interval, and a sharpness may not need to be enhanced. In this example, the sharpness information determiner 520 may determine the reference interval as an interval of which sharpness does not need to be strengthened. For example, when a denoising filter is determined to be applied to the reference interval, the sharpness information determiner 520 may determine not to apply the sharpening filter to the reference interval even though the sharpness information of the reference interval is equal to or less than the sharpness threshold.

When a large amount of noise occurs in a reference interval, an inappropriate high frequency signal may be likely to be included during a reconstruction of the high frequency signal. In this example, when postprocessing is performed on the reference interval using the sharpening filter, the inappropriate high frequency signal may be amplified, which may lead to a great reduction in a quality of frames in the reference interval. Accordingly, when the denoising filter is determined as a preprocessing filter of the reference interval, the sharpness information determiner 520 may determine that the sharpening filter is not applied to the reference interval as a postprocessing filter.

The noise information determiner 530 may analyze characteristics of the frames in the reference interval based on a dominant region, and may determine noise information of the reference interval. The noise information may be obtained by numerically expressing an average density of a dominant edge region and a dominant texture region in the frames in the reference interval, and may have a value between "0" and "1." When an amount of noise occurring in the frames in the reference interval increases, the noise information may have a value close to "1."

For example, the noise information determiner 530 may measure the noise information using Equations 10 and 11 shown below.

$$n_i = \frac{\sum Ind(G_i > T_G)}{\text{Total number of pixels in frame}} \times \Theta \quad \text{[Equation 10]}$$

$$n_{avg} = \frac{1}{N}\sum_{i=1}^{N} n_i \quad \text{[Equation 11]}$$

In Equations 10 and 11, $n_i$ denotes noise information of the i-th frame, and N denotes a number of the frames included in the reference interval. Also, $n_{avg}$ denotes noise information of the reference interval, and may be calculated as an average of the noise information $n_i$. In addition, $\Theta$ denotes a normalization constant to limit a range of the noise information $n_i$ to a range of "0" to "1."

"$\Sigma Ind(G_i>T_G)$" as a sum of impulse functions $Ind(G_i>T_G)$ of all pixels included in the i-th frame may be a number of pixels defined to be in a dominant region of the i-th frame. Accordingly, "$\Sigma Ind(G_i>T_G)$/Total number of pixels in frame" may be a density of the pixels defined to be in a dominant region of the i-th frame.

When noise information of a reference interval among the plurality of intervals exceeds a noise threshold, the noise information determiner 530 may determine the reference interval as an interval from which noise needs to be removed. The noise information determiner 530 may determine the reference interval as a target to which the denoising filter is to be applied. The noise information determiner 530 may determine a parameter associated with the denoising filter so that a strength of the denoising filter to be applied to the reference interval may increase as a value of the noise information of the reference interval increases.

When a high frequency signal of each of frames in a reference interval with a large amount of noise is reconstructed, an inappropriate high frequency signal may also be reconstructed. Accordingly, the denoising filter determined by the sharpening filter/denoising filter determiner 220 may be applied as a preprocessing filter to the reference interval.

FIG. 6 is a diagram provided to explain an operation of a sharpening filter/denoising filter determiner according to an embodiment.

In FIG. 6, a first interval 610, a second interval 620 or a third interval 630 may be set as a reference interval. In addition, a noise threshold and a sharpness threshold may be set to "0.8" and "0.4," respectively, however, an example of a noise threshold and a sharpness threshold set by the sharpening filter/denoising filter determiner is not limited thereto. The first interval 610 may have noise information of "0.9" and sharpness information of "0.2." Because the noise information of the first interval 610 exceeds the noise threshold of "0.8," a noise information determiner of the sharpening filter/denoising filter determiner may determine to apply a denoising filter as a preprocessing filter to the first interval 610, and may include a determination result in filter information associated with the denoising filter.

Because the sharpness information of the first interval 610 is less than the sharpness threshold of "0.4," a sharpness information determiner of the sharpening filter/denoising filter determiner may determine to apply a sharpening filter as a postprocessing filter to the first interval 610. However, because the denoising filter is applied as a preprocessing filter to the first interval 610, the sharpness information determiner may determine not to apply the sharpening filter to the first interval 610, and may include a determination result in filter information associated with the sharpening filter, even when the sharpness information of the first interval 610 is less than the sharpness threshold.

The second interval 620 may have noise information of "0.3" and sharpness information of "0.9." Because the noise information of the second interval 620 is less than the noise threshold of "0.8," the noise information determiner may determine not to apply a denoising filter to the second interval 620, and may include a determination result in filter information associated with the denoising filter.

Because the sharpness information of the second interval 620 exceeds the sharpness threshold of "0.4," the sharpness information determiner may determine not to apply a sharpening filter to the second interval 620, and may include a determination result in filter information associated with the sharpening filter. In other words, both the denoising filter and the sharpening filter may not be applied to the second interval 620.

The third interval 630 may have noise information of "0.5" and sharpness information of "0.3." Because the noise information of the third interval 630 is less than the noise threshold of "0.8," the noise information determiner may determine not to apply a denoising filter to the third interval 630, and may include a determination result in filter information associated with the denoising filter.

Because the sharpness information of the third interval 630 is less than the sharpness threshold of "0.4," the sharpness information determiner may determine to apply a sharpening filter to the third interval 630 as a postprocessing filter, and may include a determination result in filter information associated with the sharpening filter.

Figure 7:
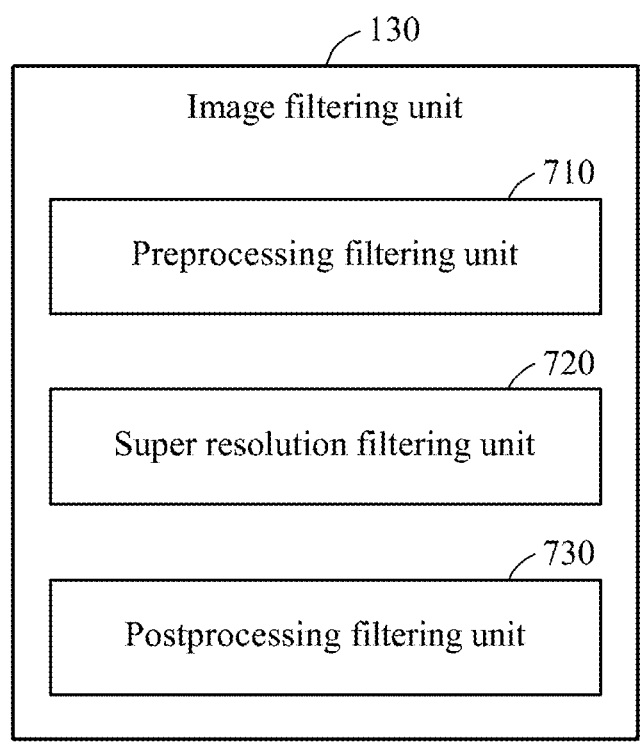
FIG. 7 is a block diagram illustrating a configuration of an image filtering unit in the image processing apparatus of FIG. 1.

FIG. 7 is a block diagram illustrating a configuration of the image filtering unit 130 of FIG. 1.

Referring to FIG. 7, the image filtering unit 130 may include a preprocessing filtering unit 710, a super resolution filtering unit 720 and a postprocessing filtering unit 730.

The preprocessing filtering unit 710 may receive the division information associated with the input video together with the input video from the interval divider 110 of FIG. 1, or may receive frames included in each of the intervals for each of the intervals.

The preprocessing filtering unit 710 may receive filter information associated with the contrast filter from the contrast filter determiner 210 of FIG. 2. The preprocessing filtering unit 710 may determine an interval to which the contrast filter is to be applied among the plurality of intervals based on the received filter information, and may set a strength of the contrast filter to be applied to the determined interval. The preprocessing filtering unit 710 may apply the contrast filter to the determined interval at the set strength in the filter information. For example, when the contrast filter is applied to the reference interval, the preprocessing filtering unit 710 may enhance contrast of the frames in the reference interval by performing filtering on the frames based on the contrast filter.

The preprocessing filtering unit 710 may receive filter information associated with the denoising filter from the noise information determiner 530 of FIG. 5. The preprocessing filtering unit 710 may determine an interval to which the denoising filter is to be applied among the plurality of intervals based on the received filter information, and may set a strength of the denoising filter to be applied to the determined interval. The preprocessing filtering unit 710 may apply the denoising filter to the determined interval at the set strength in the filter information. For example, when the denoising filter is applied to the reference interval, the preprocessing filtering unit 710 may remove noise from the frames in the reference interval by performing filtering on the frames based on the denoising filter.

When both the contrast filter and the denoising filter is not applied to the frames in the reference interval, the preprocessing filtering unit 710 may transmit the frames to the super resolution filtering unit 720, instead of performing filtering on the frames.

The super resolution filtering unit 720 may reconstruct a high frequency signal of each of the frames in the reference interval. The frames in the reference interval may be, for example, frames on which filtering is performed by the preprocessing filtering unit 710, or frames that are included in a reference interval and on which filtering is not performed depending on circumstances (for example, preprocessing filtering does not need to be performed).

The super resolution filtering unit 720 may divide each of frames into a plurality of patches, and may reconstruct a high frequency signal of each of the frames based on a plurality of high frequency patches. The plurality of high frequency patches may respectively correspond to the plurality of patches and may respectively include high frequency signals. An operation of the super resolution filtering unit 720 will be further described with reference to FIG. 8 below.

For example, the super resolution filtering unit 720 may receive the parameter associated with the sharpening filter from the sharpness information determiner 520 of FIG. 5. The super resolution filtering unit 720 may set a super resolution filter based on the received parameter. The super resolution filtering unit 720 may reconstruct a high frequency signal of each of the frames using the set super resolution filter after a similar patch search process and thus, may enhance a sharpness of the frames.

The postprocessing filtering unit 730 may receive the frames, each having the reconstructed high frequency signal, from the super resolution filtering unit 720. The postprocessing filtering unit 730 may receive filter information associated with the sharpening filter from the sharpness information determiner 520 of FIG. 5. The postprocessing filtering unit 730 may determine an interval to which the sharpening filter is to be applied among the plurality of intervals based on the received filter information, and may set a strength of the sharpening filter to be applied to the determined interval. The postprocessing filtering unit 730 may apply the sharpening filter to the determined interval at the set strength in the filter information. In other words, when the sharpening filter is applied to the reference interval, the postprocessing filtering unit 730 may enhance the sharpness of the frames in the reference interval by performing filtering on the frames based on the sharpening filter.

For example, when the sharpening filter is not applied to the frames in the reference interval, the postprocessing filtering unit 730 may output, through an output video, the frames, each having the reconstructed high frequency signal, instead of performing filtering on the frames.

Figure 8:
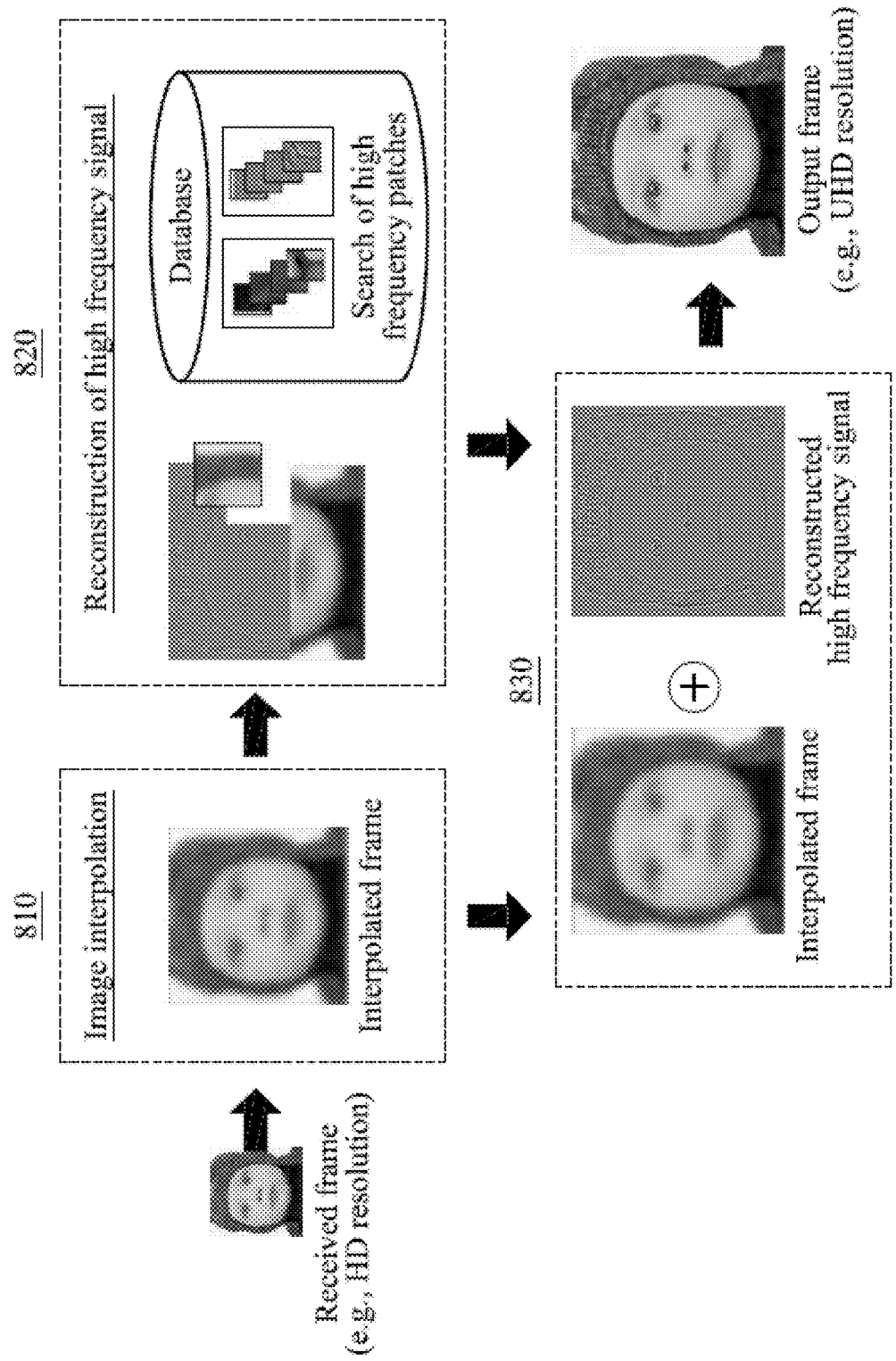
FIG. 8 is a diagram provided to explain a process of converting a frame into a super resolution frame according to an embodiment.

FIG. 8 is a diagram provided to explain a process of converting a frame into a super resolution frame according to an embodiment.

For convenience of description, a process of converting a single frame included in a reference interval into a super resolution frame is described with reference to FIG. 8. The super resolution filtering unit 720 of FIG. 7 may receive a frame with a low resolution (for example, a high-definition (HD) resolution), may convert the received frame into a super resolution frame, and may output a frame with a high resolution (for example, an ultra HD (UHD) resolution).

Referring to FIG. 8, in operation 810, a super resolution filtering unit according to an embodiment may interpolate a received frame to generate an interpolated frame. The interpolated frame may be, for example, an image obtained by zooming in the received frame with a low resolution to a high resolution using an interpolation scheme. For example, the interpolated frame may be processed as a low frequency image with a high resolution.

In operation 820, the super resolution filtering unit may reconstruct a high frequency signal of the interpolated frame. For example, the super resolution filtering unit may divide the interpolated frame into patches. Each of the patches may refer to a set of pixels having a predetermined size. Each of the patches of FIG. 8 may include, for example, 5×5 pixels.

The super resolution filtering unit may search for, as a similar patch, a low frequency patch that is most similar to each of the patches from a database. The database may store and manage a plurality of patches used to reconstruct a high frequency signal. In an example, the database may store a pair including each of a plurality of low frequency patches and each of a plurality of high frequency patches corresponding to the low frequency patches.

A low frequency patch may be obtained by dividing a low frequency image into patches, as the input video is divided into low frequency images. The low frequency patch may include a low frequency signal of the corresponding patch. A high frequency patch may be obtained by dividing a high frequency image into patches, as the input video is divided into high frequency images. The high frequency patch may include a high frequency signal of the corresponding patch. A low frequency patch and a high frequency patch determined to form a single pair may be located at the same coordinates in the low frequency image and the high frequency image. Also, a similarity between the low frequency patch and the high frequency patch may be equal to or greater than a predetermined threshold.

In another example, when a self-similarity is used, the database may store a pair including a low frequency patch extracted from an input video converted into a low resolution video and a high frequency patch corresponding to the low frequency patch. In still another example, the database may store a pair including each of a plurality of low resolution patches and each of a plurality of high resolution patches corresponding to the low resolution patches. The low resolution patches and the high resolution patches may be distinguished from each other based on a resolution indicating a size of an image for each patch.

To search for, as a similar patch, a low frequency patch corresponding to each of the patches among the stored low frequency patches from the database, the super resolution filtering unit may use at least one of an intensity-based similarity evaluation scheme of comparing pixel brightness values and a feature-based similarity evaluation scheme of comparing features, for example, an edge or a gradient. Also, the super resolution filtering unit may use various similarity evaluation schemes to search for, as a similar patch, a low frequency patch corresponding to each of the patches from the database.

The super resolution filtering unit may reconstruct a high frequency signal of each of the patches from a high frequency signal corresponding to the found similar patch. For example, the super resolution filtering unit may reconstruct a high frequency signal of each of the patches from a high frequency signal located at the same coordinates as the found similar patch.

In operation 830, the super resolution filtering unit may output a frame with a super resolution based on the frame interpolated in operation 810 and the high frequency signal reconstructed in operation 820.

Figure 9:
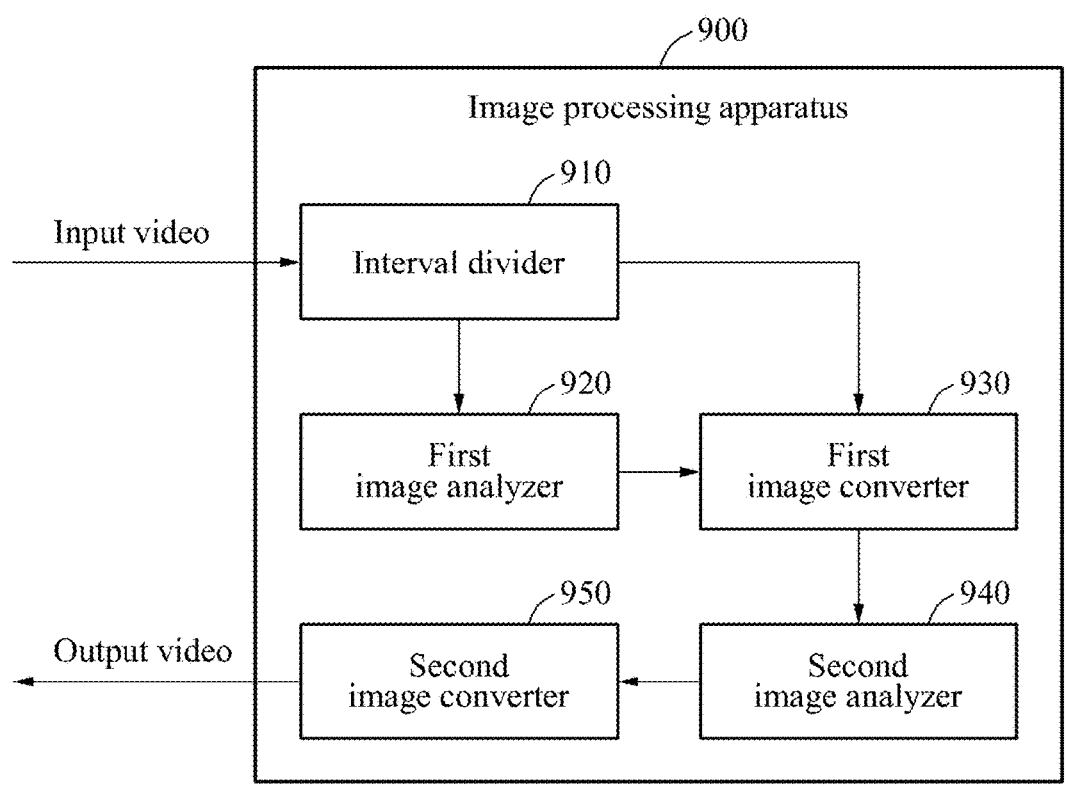
FIG. 9 is a block diagram illustrating another example of an image processing apparatus according to an embodiment.

FIG. 9 is a block diagram illustrating an image processing apparatus 900 according to an embodiment.

Referring to FIG. 9, the image processing apparatus 900 may include an interval divider 910, a first image analyzer 920, a first image converter 930, a second image analyzer 940 and a second image converter 950.

The interval divider 910 may divide an input video into a plurality of intervals. The interval divider 910 may have the same configuration as that of the interval divider 110 of FIG. 1 and accordingly, further description thereof will be omitted here.

The first image analyzer 920 may analyze characteristics of frames included in a reference interval among the plurality of intervals into which the input video is divided. The first image analyzer 920 may determine a preprocessing filter to be applied to the reference interval based on an analysis result. The first image analyzer 920 may determine preprocessing filters to be applied to each of the plurality of intervals in the input video. However, for convenience of description, an operation of the image processing apparatus 900 as well as the first image analyzer 920 will be described below based on a reference interval among the plurality of intervals.

In an example, the first image analyzer 920 may determine at least one of a contrast filter and a denoising filter as a preprocessing filter to be applied to the reference interval, and may include a determination result in filter information associated with the contrast filter and filter information associated with the denoising filter. In another example, the first image analyzer 920 may determine not to apply the preprocessing filter to the reference interval based on the characteristics of the frames in the reference interval, and may include a determination result in filter information associated with the contrast filter and filter information associated with the denoising filter.

The first image analyzer 920 may transmit the filter information including the determination result to the first image converter 930.

The first image converter 930 may perform image conversion on the frames in the reference interval based on the filter information received from the first image analyzer 920. The first image converter 930 may determine whether a preprocessing filter is applied to the reference interval based on the filter information. When the preprocessing filter is applied, the first image converter 930 may perform filtering on the frames in the reference interval based on at least one of the contrast filter and the denoising filter.

The first image converter 930 may reconstruct a high frequency signal of each of the frames on which preprocessing filtering is performed. In other words, the first image converter 930 may convert the frames on which preprocessing filtering is performed into super resolution frames. However, when the preprocessing filter is not applied to the reference interval based on the filter information, the first image converter 930 may reconstruct a high frequency signal of each of the frames in the reference interval, instead of performing preprocessing filtering on the frames.

The second image analyzer 940 may analyze characteristics of the frames, each having the high frequency signal reconstructed by the first image converter 930. For example, the second image analyzer 940 may calculate at least one of contrast information, noise information and sharpness information of the frames, each having the reconstructed high frequency signal, and may analyze the characteristics of the frames.

The second image analyzer 940 may determine a postprocessing filter to be applied to the reference interval based on an analysis result. For example, the second image analyzer 940 may determine at least one of a sharpening filter, a contrast filter and a denoising filter as a postprocessing filter to be applied to the reference interval. The second image analyzer 940 may include a determination result in filter information, and may transmit the filter information including the determination result to the second image converter 950.

The second image converter 950 may perform image conversion on the frames in the reference interval based on the filter information received from the second image analyzer 940. The second image converter 950 may determine whether a postprocessing filter is applied to the reference interval based on the filter information. When the postprocessing filter is applied, the second image converter 950 may perform filtering on the frames in the reference interval based on at least one of the sharpening filter, the contrast filter and the denoising filter.

For example, the second image converter 950 may set priorities to each of the sharpening filter, the contrast filter and the denoising filter. When applying of a plurality of filters to the reference interval is requested based on the filter information received from the second image analyzer 940, the second image converter 950 may select a filter to be applied to the reference interval, and a sequence of filtering based on the priorities.

When a contrast of the reference interval is enhanced using the contrast filter, undesired noise may occur in the reference interval. Accordingly, the second image converter 950 may set a highest priority to the contrast filter, and may apply the contrast filter to the reference interval before the denoising filter is applied.

When it is determined that both the denoising filter and the sharpening filter need to be applied to the reference interval, the second image converter 950 may apply the denoising filter to the reference interval, and may not apply the sharpening filter.

In an example, a value of contrast information of the reference interval may be equal to or less than a contrast threshold, a value of sharpness information of the reference interval may be equal to or less than a sharpness threshold, and a value of noise information of the reference interval may be equal to or greater than a noise threshold. In this example, the second image analyzer 940 may determine to apply all of the contrast filter, the sharpening filter and the denoising filter, may include a determination result in filter information and may transmit the filter information including the determination result to the second image converter 950.

The second image converter 950 may perform filtering on the frames, each having the reconstructed high frequency signal, using the contrast filter with the highest priority. The second image converter 950 may perform, using the denoising filter, filtering on the frames on which the filtering is performed using the contrast filter. However, the second image converter 950 may not apply the sharpening filter to the reference interval.

In another example, a value of contrast information of the reference interval may be equal to or less than a contrast threshold, a value of sharpness information of the reference interval may be equal to or less than a sharpness threshold, and a value of noise information of the reference interval may be equal to or less than a noise threshold. In this example, the second image analyzer 940 may determine to apply the contrast filter and the sharpening filter, may include a determination result in filter information and may transmit the filter information including the determination result to the second image converter 950.

The second image converter 950 may perform filtering on the frames, each having the reconstructed high frequency signal, using the contrast filter with the highest priority. The second image converter 950 may perform, using the sharpening filter, filtering on the frames on which the filtering is performed using the contrast filter.

The above description of FIGS. 1 through 8 is also applicable to FIG. 9 and accordingly, will not be repeated here.

Figure 10:
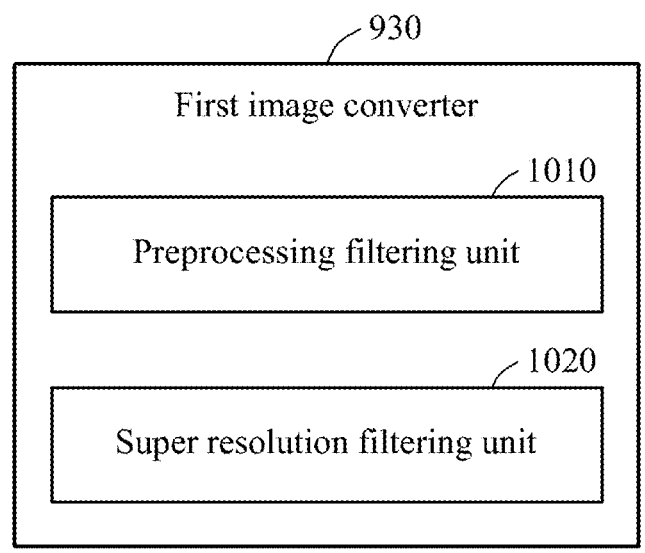
FIG. 10 is a block diagram illustrating a configuration of a first image converter in the image processing apparatus of FIG. 9.

FIG. 10 is a block diagram illustrating a configuration of the first image converter 930 of FIG. 9.

Referring to FIG. 10, the first image converter 930 may include a preprocessing filtering unit 1010 and a super resolution filtering unit 1020.

The preprocessing filtering unit 1010 may receive division information associated with the input video together with the input video from the interval divider 910 of FIG. 9, or may receive frames included in each of the intervals for each of the intervals.

The preprocessing filtering unit 1010 may receive the filter information associated with the contrast filter and the filter information associated with the denoising filter from the first image analyzer 920 of FIG. 9. The preprocessing filtering unit 1010 may determine, based on the filter information, whether at least one of the contrast filter and the denoising filter is applied to the reference interval. The preprocessing filtering unit 1010 may perform filtering on the frames in the reference interval using at least one of the contrast filter and the denoising filter based on a determination result. The preprocessing filtering unit 1010 may control a strength of at least one of the contrast filter and the denoising filter based on the filter information.

The super resolution filtering unit 1020 may reconstruct a high frequency signal of each of the frames in the reference interval. For example, the super resolution filtering unit 1020 may reconstruct a high frequency signal of each of frames on which filtering is performed by the preprocessing filtering unit 1010. Also, the super resolution filtering unit 1020 may reconstruct a high frequency signal of each of frames on which preprocessing filtering is not performed depending on circumstances (for example, when it is determined that the preprocessing filtering does not need to be performed).

The above description of FIGS. 1 through 9 is also applicable to FIG. 10 and accordingly, will not be repeated here.

Figure 11:
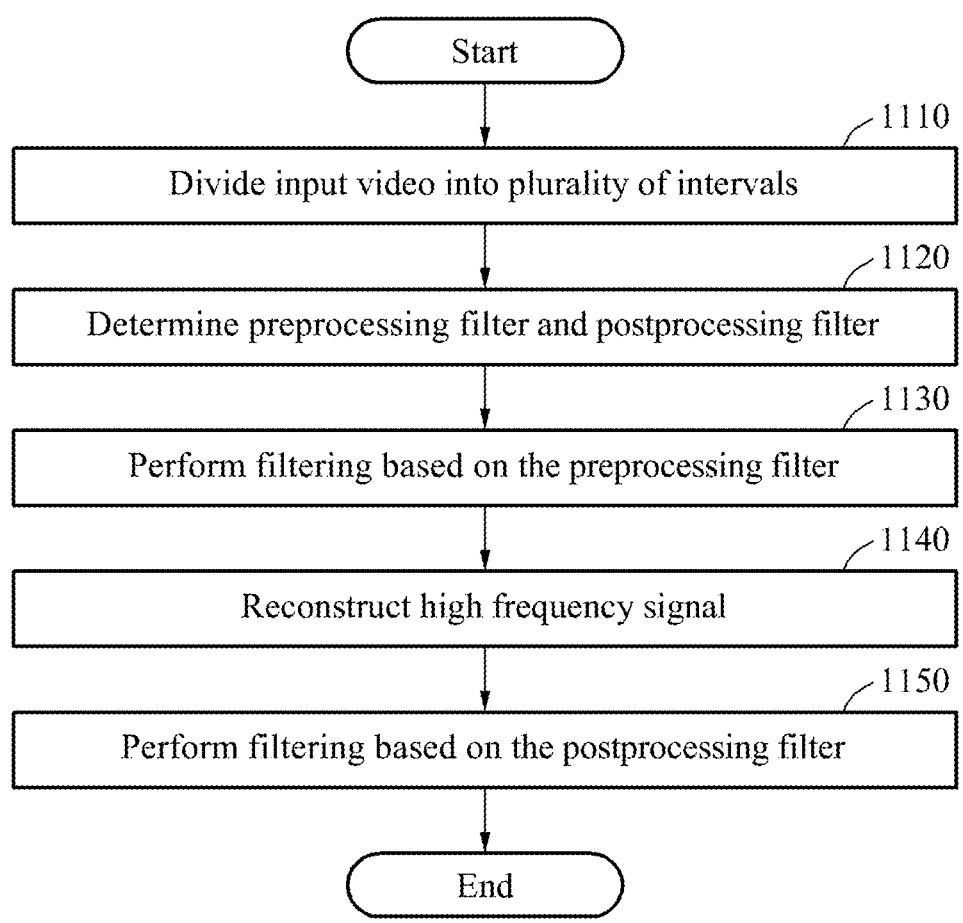
FIG. 11 is a flowchart illustrating an example of an image processing method according to an embodiment.

FIG. 11 is a flowchart illustrating an example of an image processing method according to an embodiment.

The image processing method of FIG. 11 may be performed by a processor included in an image processing apparatus according to an embodiment.

Referring to FIG. 11, in operation 1110, the image processing apparatus may divide an input video into a plurality of intervals. The image processing apparatus may divide the input video into the plurality of intervals based on whether a scene changes in the input video.

In operation 1120, the image processing apparatus may determine a preprocessing filter and a postprocessing filter based on frames in a reference interval among the plurality of intervals. The image processing apparatus may analyze characteristics of the frames in the reference interval. For example, the image processing apparatus may calculate contrast information, noise information and sharpness information of the reference interval.

The image processing apparatus may determine whether a contrast filter is to be applied as a preprocessing filter to the reference interval, based on the contrast information, and may determine a parameter for the contrast filter. Also, the image processing apparatus may determine whether a denoising filter is to be applied as a preprocessing filter to the reference interval, based on the noise information, and may determine a parameter for the denoising filter. In addition, the image processing apparatus may determine whether a sharpening filter is to be applied as a postprocessing filter to the reference interval, based on the sharpness information, and determine a parameter for the sharpening filter. The image processing apparatus may include the above determination results in filter information.

In operation 1130, the image processing apparatus may perform filtering on the frames in the reference interval based on the preprocessing filter. The image processing apparatus may determine whether at least one of the contrast filter and the denoising filter is applied as a preprocessing filter to the reference interval based on the filter information. The image processing apparatus may perform filtering on the frames in the reference interval using a filter determined to be applied to the reference interval.

In operation 1140, the image processing apparatus may reconstruct a high frequency signal of each of the frames on which the filtering is performed using the preprocessing filter. The image processing apparatus may convert the frames into super resolution frames by reconstructing the high frequency signal. For example, when the preprocessing filter does not need to be applied to the reference interval, the image processing apparatus may reconstruct a high frequency signal of each of frames on which filtering is not performed using the preprocessing filter.

In operation 1150, the image processing apparatus may perform filtering on the frames, each having the reconstructed high frequency signal, based on the postprocessing filter. The image processing apparatus may determine whether the sharpening filter is applied as a postprocessing filter to the reference interval, based on the filter information. When the sharpening filter is determined to be applied, the image processing apparatus may perform filtering on the frames, each having the reconstructed high frequency signal, based on the sharpening filter.

The above description of FIGS. 1 through 8 is also applicable to FIG. 11 and accordingly, will not be repeated here.

FIG. 12 is a flowchart illustrating another example of an image processing method according to an embodiment.

The image processing method of FIG. 12 may be performed by a processor included in an image processing apparatus according to an embodiment.

Referring to FIG. 12, in operation 1210, the image processing apparatus may divide an input video into a plurality of intervals.

In operation 1220, the image processing apparatus may determine a preprocessing filter based on frames in a reference interval among the plurality of intervals. The image processing apparatus may analyze characteristics of the frames in the reference interval, and may determine a preprocessing filter to be applied to the reference interval. The image processing apparatus may determine at least one of a contrast filter and a denoising filter as a preprocessing filter to be applied to the reference interval.

In operation 1230, the image processing apparatus may perform filtering on the frames in the reference interval based on the preprocessing filter. The image processing apparatus may reconstruct a high frequency signal of each of the frames on which the filtering is performed. For example, when the preprocessing filter does not need to be applied to the reference interval, the image processing apparatus may reconstruct a high frequency signal of each of frames on which filtering is not performed using the preprocessing filter.

In operation 1240, the image processing apparatus may determine a postprocessing filter based on the frames, each having the reconstructed high frequency signal. The image processing apparatus may analyze characteristics of the frames, each having the reconstructed high frequency signal, and may determine a postprocessing filter to be applied to the reference interval.

In operation 1250, the image processing apparatus may perform filtering on the frames, each having the reconstructed high frequency signal, based on the postprocessing filter.

The above description of FIGS. 1 through 10 is also applicable to FIG. 12 and accordingly, will not be repeated here.

According to embodiments, during conversion of an input video into a super resolution video, a preprocessing filter and a postprocessing filter optimized for each of a plurality of intervals in the input video may be determined and filtering on the plurality of intervals may be performed and thus, it is possible to effectively convert the input video into the super resolution video.

In addition, according to embodiments, contrast filtering may be performed before an input video is converted into a super resolution video and thus, it is possible to prevent an inappropriate high frequency signal from being reconstructed due to a weak contrast during conversion of the input video into the super resolution video.

Furthermore, according to embodiments, denoising filtering may be performed before an input video is converted into a super resolution video and thus, it is possible to prevent an inappropriate high frequency signal from being reconstructed due to noise during conversion of the input video into the super resolution video.

Moreover, according to embodiments, sharpening filtering may be performed after an input video is converted into a super resolution video and thus, it is possible to enhance a sharpness of a portion of high frequency signals that are insufficiently reconstructed during conversion of the input video into the super resolution video. Also, it is possible to effectively prevent an inappropriate high frequency signal from being reconstructed when the sharpening filtering is performed as preprocessing filtering before the input video is converted into the super resolution video.

The units described herein may be implemented using hardware components, software components, or a combination thereof. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An image processing method, comprising:
dividing an input video into a plurality of intervals;
determining a preprocessing filter and a postprocessing filter based on frames of the input video included in a reference interval of the plurality of intervals;
performing filtering on the frames based on the preprocessing filter;
reconstructing a signal of each of the frames on which the filtering is performed;
performing filtering on the frames using the postprocessing filter; and
outputting an output video comprising the filtered frames, wherein each of the frames comprises the reconstructed signal,
wherein the determining of the preprocessing filter and the postprocessing filter comprises:
calculating contrast information of the frames in the reference interval, and determining, based on the contrast information, whether a contrast filter is to be applied as the preprocessing filter, and
determining a parameter to be applied to the contrast filter based on the contrast information and a contrast threshold, in response to the contrast filter being determined to be applied as the preprocessing filter, and
wherein a strength of the contrast filter is adjusted based on a difference between the contrast information and the contrast threshold.

2. The image processing method of claim 1, wherein the dividing of the input video into the plurality of intervals comprises detecting a boundary frame in which a scene changes in the input video, and dividing the input video into the plurality of intervals based on the boundary frame.

3. The image processing method of claim 1, wherein the reconstructing of the signal comprises dividing each of the frames into a plurality of patches and reconstructing the signal based on corresponding patches of the plurality of patches that comprise signals.

4. The image processing method of claim 1, further comprising outputting the frames on which the filtering is performed based on the postprocessing filter, for each of the plurality of intervals.

5. The image processing method of claim 1, wherein a similarity in a characteristic between the frames in the reference interval is less than or equal to a threshold, and the characteristic comprises any one or any combination of two or more of a background, an illumination environment, or a zoom-in.

6. An image processing method, comprising:
dividing an input video into a plurality of intervals;
determining a preprocessing filter and a postprocessing filter based on frames of the input video included in a reference interval of the plurality of intervals;
performing filtering on the frames based on the preprocessing filter;
reconstructing a signal of each of the frames on which the filtering is performed;
performing filtering on the frames using the postprocessing filter; and
outputting an output video comprising the filtered frames,
wherein each of the frames comprises the reconstructed signal, and
wherein the determining of the preprocessing filter and the postprocessing filter comprises:
calculating noise information of the frames in the reference interval, and determining, based on the noise information, whether a denoising filter is to be applied as the preprocessing filter;
determining a parameter to be applied to the denoising filter to adjust a strength of the denoising filter based on a difference between the noise information and a noise threshold based on the noise information, in response to the denoising filter being determined to be applied as the preprocessing filter; and
determining that a sharpening filter is not to be applied as the postprocessing filter, in response to sharpness information being equal to or less than a sharpness threshold and the noise information being equal to or greater than the noise threshold.

7. An image processing apparatus comprising:
at least one processor; and
a memory having instructions stored thereon executed by the at least one processor to perform:
dividing an input video into a plurality of intervals;
determining a preprocessing filter and a postprocessing filter based on frames of the input video included in a reference interval of the plurality of intervals;
filtering the frames in the reference interval using the preprocessing filter, to reconstruct a signal of each of the frames on which the filtering is performed, and to perform filtering on the frames using the post processing filter; and
outputting an output video comprising the filtered frames,
wherein each of the frames comprise the reconstructed signal,
wherein the determining of the preprocessing filter and the postprocessing filter comprises:
calculating sharpness information of the frames in the reference interval; and
determining, based on the sharpness information, a sharpness threshold, noise information of the frames in the reference interval, and a noise threshold, whether a sharpening filter is to be applied as the postprocessing filter, and
wherein the determining of whether the sharpening filter is to be applied as the postprocessing filter comprises determining that the sharpening filter is not to be applied as the postprocessing filter, in response to the sharpness information being equal to or less than the sharpness threshold and the noise information of the frames in the reference interval being equal to or greater than the noise threshold.

8. The image processing method of claim 7, wherein the filter determiner is further configured to determine the preprocessing filter and the postprocessing filter by determining a parameter to be applied to the sharpening filter based on the sharpness information, in response to the sharpening filter being determined to be applied as the postprocessing filter.

9. The image processing method of claim 8, wherein the parameter is determined based on a difference between the sharpness information and a sharpness threshold.

10. The image processing apparatus of claim 7, wherein the filter determiner is further configured to calculate contrast information of the frames in the reference interval, and to determine whether a contrast filter is to be applied as the preprocessing filter based on the contrast information.

11. The image processing apparatus of claim 7, wherein the filter determiner is further configured to determine whether a denoising filter is to be applied as the preprocessing filter based on the noise information.

* * * * *